March 11, 1930.　　C. W. EGGENWEILER　　1,749,761
BROACHING MACHINE
Filed July 7, 1925　　3 Sheets-Sheet 1

INVENTOR.
Charles W. Eggenweiler
BY
ATTORNEYS

March 11, 1930. C. W. EGGENWEILER 1,749,761
BROACHING MACHINE
Filed July 7, 1925 3 Sheets-Sheet 3
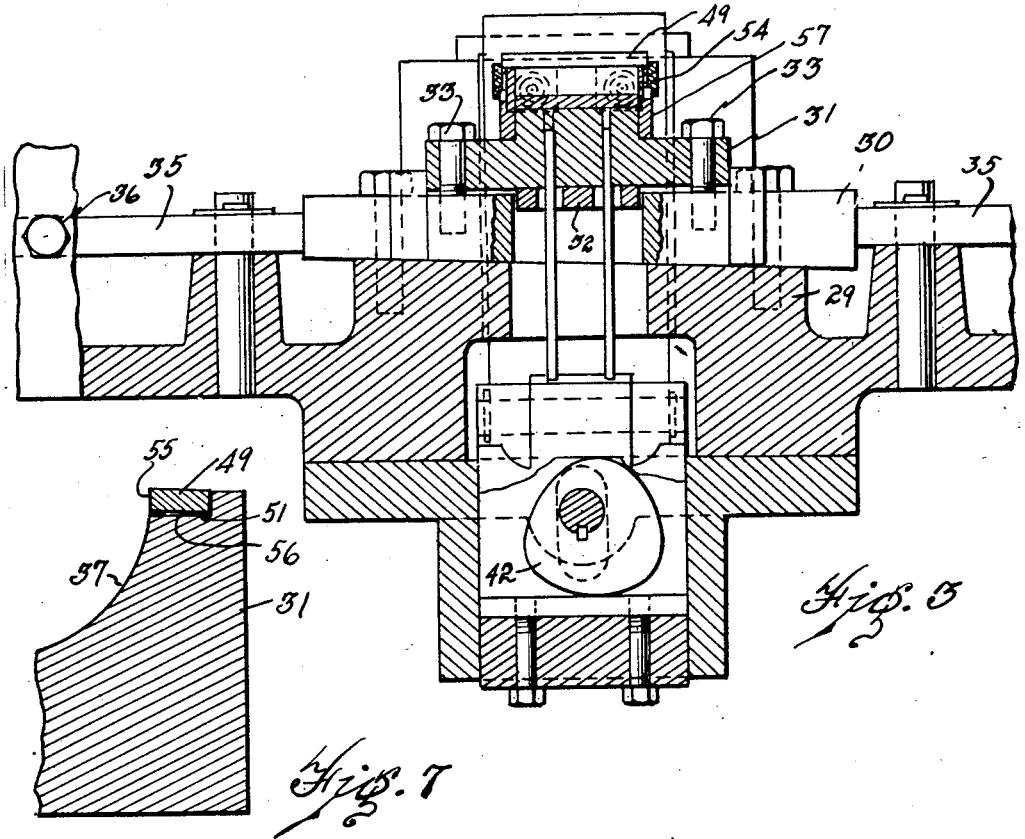
Fig. 3
Fig. 7
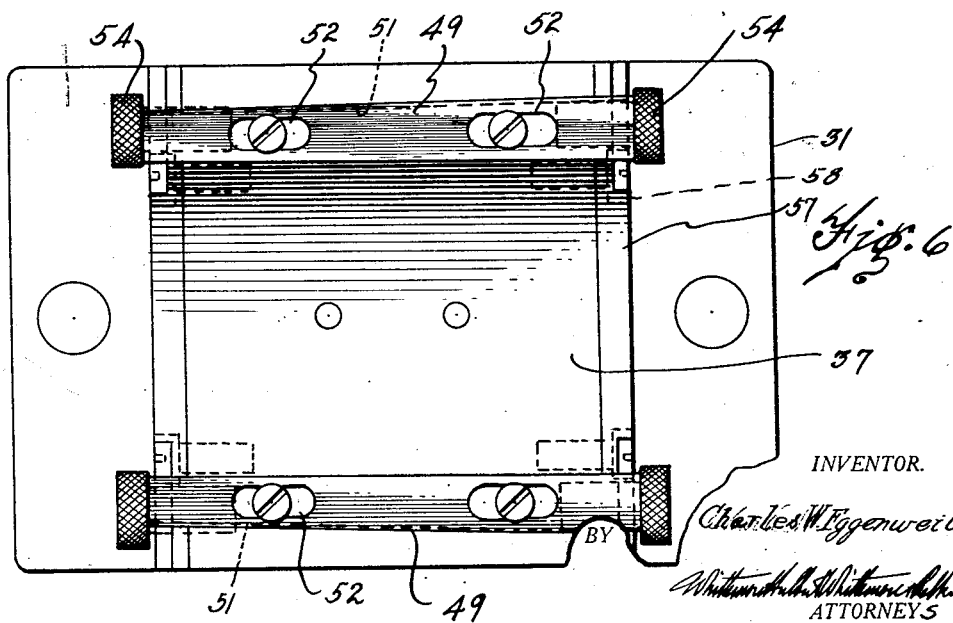
Fig. 6
INVENTOR.
Charles W. Eggenweiler
BY
ATTORNEYS Patented Mar. 11, 1930

1,749,761

UNITED STATES PATENT OFFICE

CHARLES W. EGGENWEILER, OF DETROIT, MICHIGAN, ASSIGNOR TO BOHN ALUMINUM AND BRASS CORPORATION, OF DETROIT, MICHIGAN, A CORPORATION OF MICHIGAN

BROACHING MACHINE

Application filed July 7, 1925. Serial No. 42,005.

This invention relates to broaching machines and more particularly to an adjustable block or work holder for broaching machines designed particularly for use in connection with the broaching of half bearing or like sections.

In the manufacture of half bearings or bearing sections difficulty has been experienced in producing and maintaining a uniform wall thickness particularly at the parting edges of the bearing section due probably to the flow of metal toward the parting edges thereof as a result of the stresses to which the metal is subjected during the manufacture of the bearing. While this difference in wall thickness is relatively infinitesimal it has proved objectionable in the perfect or accurate and interchangeable bearings to which this invention pertains. This objection has been corrected in a majority of the bearings manufactured by employing a relief cutter which is brought into operation after the bearing is broached to cut away a portion of the bearing adjacent its parting edges to provide a relief. While this has generally proven satisfactory such practice has not the approval of certain classes of the purchasers of these bearings and has met with particular disapproval when the bearing sections are used as vertical bearings, that is with their parting edges vertically arranged.

It is therefore particularly desirable in the production of otherwise perfect, accurate and interchangeable bearings, to produce and maintain a uniform wall thickness throughout, especially when these bearings are to be used as vertical bearings. Furthermore it is desirable to eliminate the relief cutter heretofore used and to provide means whereby the bearing section may be so supported that the broach may be employed either for producing the desired degree of relief at the parting edges of the bearing or to broach the bearing to produce a uniform wall thickness throughout.

These objects are accomplished by the use of an adjustable block or work holder, forming the particular subject matter of this invention, in connection with a broaching machine providing means for producing an accurate reciprocation of the broach and an adjustable but rigid mounting for the work holder.

Figure 1:
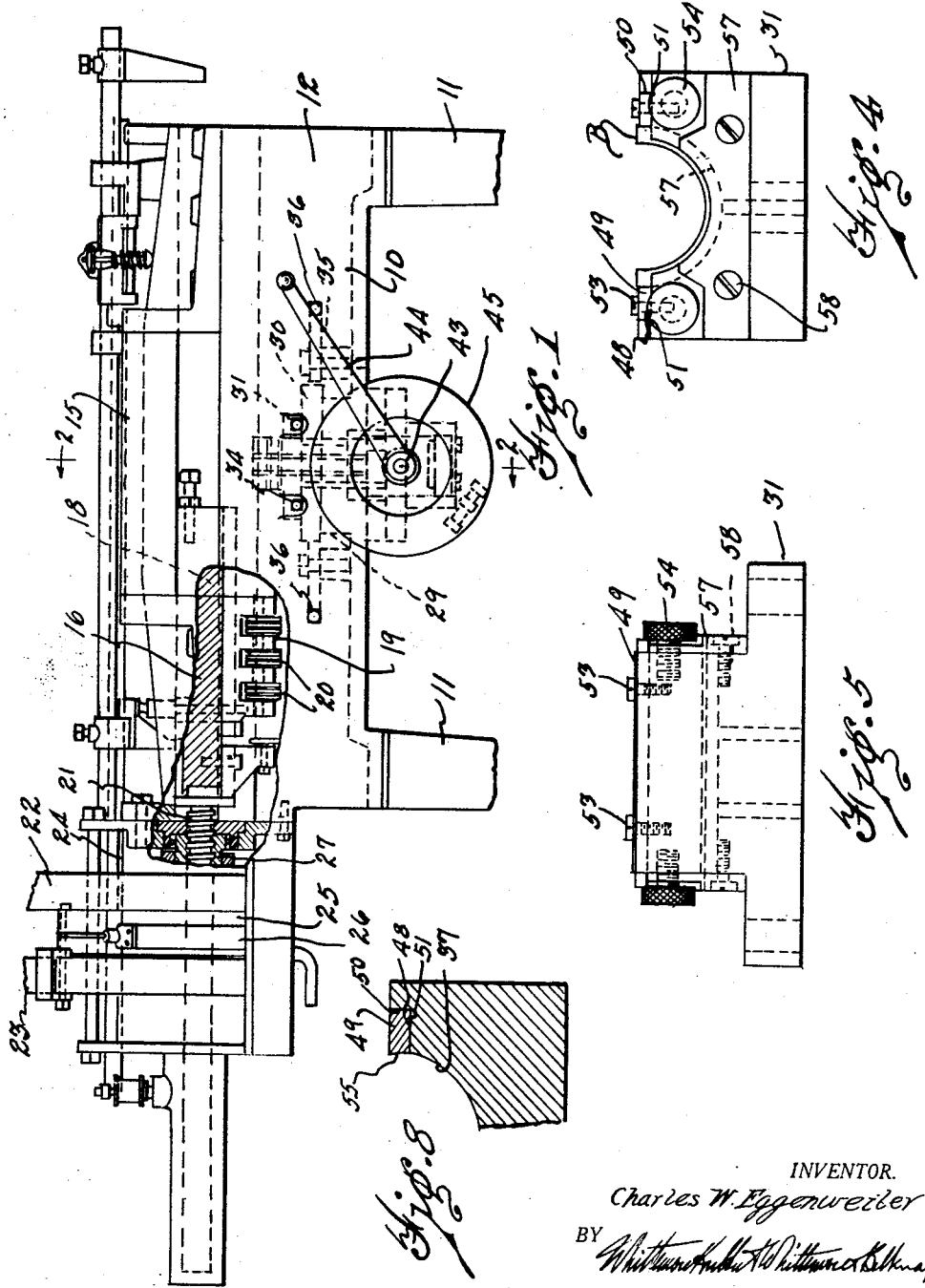
Figure 2:
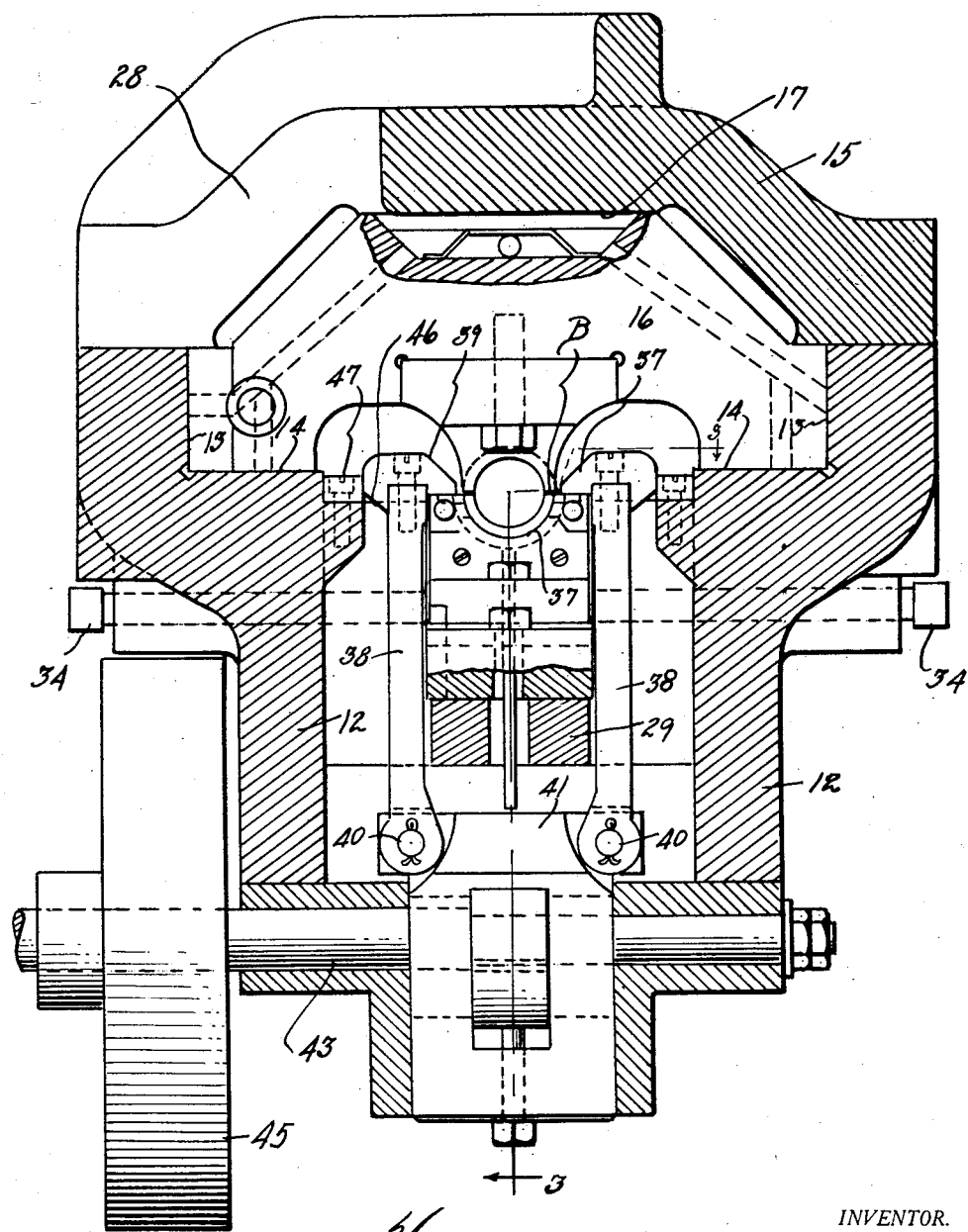

These and various other objects, advantages, and novel details of construction of my improved invention will be made more apparent as this description proceeds, especially when considered in connection with the accompanying drawings wherein Figure 1 is a side elevation, partly in section, of a broaching machine with my invention associated therewith, Figure 2 is a fragmentary transverse vertical sectional view taken substantially on the plane indicated by line 2—2 in Figure 1, Figure 3 is an enlarged fragmentary sectional view taken substantially on the line indicated by 3—3 in Figure 2, Figure 4 is an end elevation of the work holder detached, Figure 5 is a side elevation thereof, Figure 6 is a top plan view thereof, Figure 7 is a fragmentary transverse sectional view showing a step in the production of the adjustable plates, and Figure 8 is a transverse sectional view through the work holder.

The adjustable work holder forming the particular subject matter of this invention is particularly designed for use in connection with broaching machines of the character described in my copending application invented jointly with William J. Feigel, Serial Number 746,069, filed October 27, 1924. While the present invention is not necessarily limited to a broaching machine of the specific construction illustrated in the said copending application and, as will appear hereinafter, may be employed with various other types of broaching machines, still the invention finds particular utility with such a type of broaching machine wherein the broach is mounted for reciprocation in an accurate predetermined path and whereby further the work holder is rigidly mounted in a position fixed with reference to the broach but is capable of adjustment for properly aligning the bearing with reference to the reciprocal broach.

Referring now particularly to Figures 1 to 3 of the drawings, the broaching machine will be sufficiently illustrated and described to permit a complete understanding of the cooperation between the adjustable block and the broaching machine, and the operation of the parts whereby the accurate or interchangeable bearing is produced. The body of the machine comprises a suitable bed 10 preferably supported upon standards 11, the bed being preferably channel-shaped and provided with upstanding front and rear walls 12 formed with vertical guide surfaces 13 and aligned horizontal supporting guide surfaces 14. A cap 15 is suitably secured in place and formed with openings for facilitating the assembly of the interior parts of the machine as well as to permit the inserting and removing of the bearing sections from the work holder yet to be referred to.

A reciprocable slide 16 is mounted upon bearing surfaces 14 and engages also vertical bearing surfaces 13 as well as the horizontal bearing surface 17 formed on the under face of cap 15 so that this slide, and the parts carried thereby, which are to be later referred to, may be reciprocated in an absolutely predetermined accurate path.

Rigidly mounted to slide 16 by means of bolts 18 is a broach 19 of any suitable or desired type, but herein shown as comprising a plurality of sets of annular teeth 20. During the reciprocation of slide 16 broach 19 is adapted to be reciprocated past the work and to engage the work during its reciprocation in one direction to broach the bearing face thereof. The slide 16 may be reciprocated in any desired manner but is preferably operated by a screw 21 suitably supported by the machine and operable in opposite directions by belts 22 and 23 shiftable from idler pulleys 24 onto a fixed pulley 25. The belt shifting mechanism also carries a brake 26, shiftable therewith so that as either of belts 22 or 23 are moved onto fixed pulley 25 brake 26 is moved therefrom, but upon an operation of the belt shifting mechanism to move either belt onto its idler pulley brake 26 is again moved onto fixed pulley and applied, thus stopping the rotation of screw 21. It is understood that fixed pulley 25 is keyed to operate internally threaded sleeve 27 which upon rotation reciprocably operates screw 21, which in turn reciprocates slide 16 and broach 19. Belts 22 and 23 are manually shiftable onto fixed pulley 25 but preferably automatic means are provided, operable by slide 16, for shifting the active belt 22 or 23 onto its idler pulley at the end of each reciprocation of the slide.

The bed 10 of the machine is provided intermediate its ends and preferably adjacent work inserting and removing opening 28 with a raised portion 29 which is integral with the bottom and side walls of the bed 10. The upper face of the raised portion 29 is inclined from end to end of the machine and supports thereon a wedge 30 having a horizontal upper face. Upon this wedge is mounted the work holder 31 forming the particular subject matter of this invention. Interposed between work holder 31 and wedge 30 is a block 32 formed preferably of yieldable material such as brass. This block engages a recess in the upper face of wedge 30 and by providing a plurality of set screws 33 the work holder 31 may be adjustably secured to the wedge 30, the block 32 being compressed by adjusting set screws 33 to control the angle of inclination of the holder. The work holder 31 is also adjustable parallel to the wedge 30 by means of a series of set screws 34 threadedly engaging the side walls 12 of the bed 10 and abutting the work holder adjacent its lower edge. Rockable levers 35 in the form of bell cranks are pivotally mounted on the bottom wall of bed 10 and are adapted to swing horizontally and to engage with one of their ends the opposite ends of wedge 30 whereby this wedge may be longitudinally adjusted, the levers 35 being rocked by means of set screws 36 threadedly engaging the front wall 12 of bed 10. Thus the work holder 31 is capable of several adjustments so that the bearing section to be broached may be accurately adjusted and positioned with reference to the broach.

The bearing section B which is adapted to be seated in the concave semi-cylindrical recess 37 formed in the work holder 31 is clamped and held in place by vertically extending clamping bars 38 formed with heads 39 which extend horizontally from bar 38 and engage the upper or parting edges of bearing section B. The lower ends of these clamping bars are pivoted as at 40 to a block 41 which is vertically adjustable by means of a rotary cam 42 fixed on a shaft 43 and rotatable by an operating handle or arm 44, a fly wheel 45 being also fixed to shaft 43. Hence clamping bars 38 may be vertically reciprocated to cause heads 39 to engage bearing B, the heads 39 being provided with cam surfaces 46 engageable with blocks 47 for forcing the clamping heads inwardly toward the bearing B during the downward reciprocation, this movement being resisted by suitable springs (not shown) tending normally to urge bars 38 outwardly.

By referring to Figures 4 to 8 inclusive the specific construction of the work holder 31 will be described. The upper face of the work holder adjacent the bearing receiving recess is cut away longitudinally as at 48 to form open-sided recesses adapted to receive longitudinally tapering blocks or inserts 49. The wall 50 of each recess is longitudinally inclined for engagement by a correspondingly inclined wall of the insert strip 49. The inner corner of each recess is also slightly undercut as indicated at 51. Insert strips 49 are adapted to lie within the cut-away portions or recesses 48 to engage the upper longitudinal portions of bearing B immediately adjacent to but spaced from the parting edges. Each insert strip is preferably formed with a plurality of elongated slots 52 through which are passed clamping bolts 53 which are threaded into the work holder block 31 for clamping inserts 49 in place. The longitudinal adjustment of strips 49 is accomplished by means of headed adjusting bolts 54, a pair of these adjusting bolts being associated with each insert strip 49 and being provided with right and left-hand threads respectively. These bolts threadedly engage the ends of work holder 31 and by their engagement with the ends of strips 49 longitudinally adjust these strips, and owing to the wedging action between the strips and the recesses a clamping action is imparted to the upper longitudinal edges of the bearing section B.

In preparing the work holder the active face 55 of each insert strip 49 is formed with a transversely arcuate face, the center of which arc is non-coincident with the center of the arc of face 37 of the work holder. This is accomplished by placing a shim 56 under each insert strip 49 in such a manner as to raise the longitudinal edge of the strip 49, which is adjacent the bearing receiving face or recess 37. This is done prior to the time that the bearing receiving recess is ground to size. With the inserts 49 thus held out of normal position the surfaces 37 and 55 are ground, the arcs of these surfaces being then coincident. After having been ground to size the shims 56 are removed and inserts 49 permitted to rest entirely within recesses 48. This results in the face 55 of each insert having an arcuate face, the center of which is different or non-coincident with the center of the arc of the face 37, the curvature of the faces 55 being indicated somewhat exaggerated in Figure 8. It is noted that the upper inner edge of each strip 49 is caused to extend or protrude inwardly in the direction of the bearing B to some extent.

To prevent longitudinal displacement of the bearing section B with reference to the holder 31 end plates 57 may be provided which are secured in place by suitably arranged bolts 58 threadedly engaging the work holder 31.

In practice the bearing B will be inserted in the work holder prior to which the inserts 49 have been longitudinally adjusted to their proper positions dependent upon the amount of material to be taken from adjacent the parting edges of the bearing B. When the clamping bars 38 are thereafter actuated to cause heads 39 to engage the longitudinal edges of bearing B the faces 55 of insert strips 49 will act upon the longitudinal edges of bearing B to force the same inwardly. Consequently, upon a reciprocation of slide 16 and a consequential engagement of the broach with the bearing those portions of the bearing adjacent the longitudinal edges will be broached or cut away to an extent depending upon the adjustment of insert strips 49. This adjustment may be such as to compensate only for the springing of the work holder, may be such as to provide a relief adjacent the parting edges of the bearing, or may be such that the broached bearing will have a wall of uniform thickness throughout.

The construction of the broaching machine is such as to permit of such accurate adjustment of the work holder and such an accurate reciprocation of the broach as to produce a practically perfect and an interchangeable bearing. With such accurate operations possible the use of the adjustable block or work holder affords means for entirely eliminating the relief cutters heretofore employed and to accomplish the operations of this relief cutter with the broach itself and in addition thereto to so broach the bearing as to produce a uniform wall thickness throughout whereby the bearing sections are suitable for use in vertical bearings.

As was hereinbefore pointed out, the adjustable block is not necessarily limited in its use to a broaching machine such as herein described, and furthermore various modifications of this specific construction of the adjustable block may be resorted to without departing from the spirit and scope of this invention, and to this end reservation is made to make such changes as may come within the purview of the accompanying claims.

What I claim as my invention is:

1. In a work holder for use with a broaching machine, a block formed with a recess for receiving a bearing or like section, and adjustable sections constituting portions of the wall of said recess for adjusting the parting edges of said bearing relative to each other.

2. In a work holder for use with broaching machines, a block formed with a recess for receiving a bearing or like section, the transverse shape of said recess including non-coincident arcs, and means for adjusting a parting edge of said bearing relative to the remainder thereof, said means including an adjustable member having a face forming a continuation of the wall of said recess and constituting one of said arcs.

3. In a work holder for use with a broaching machine, a block formed with a recess substantially semi-circular in cross section, and adjustable members arranged upon opposite sides of said recess and constituting a continuation of the wall of said recess for adjusting the parting edges of a bearing supported therein relative to the body of the bearing, the faces of said members being formed on an arc having a different radius than that of said recess.

4. In a work holder for supprting bearing and like sections in a broaching machine or the like, a block formed with a suitably shaped recess to receive a bearing section, and members adjustably secured to said block and adapted for longitudinal engagement with said bearing section adjacent its parting edges for adjusting said parting edges relative to each other.

5. A work support for broaching machines including a reciprocable broach, comprising a work holder for receiving a bearing or like section to be broached, and adjustable inserts on said work holder engageable with the parting edges of the bearing section for adjusting the same relative to each other.

6. A work holder for half bearing or like sections, comprising a block formed with a substantially semi-circular recess for receiving a bearing section, one face of said block being formed with recesses, and inserts in said recesses adapted to engage the free longitudinal edges of the bearing section to adjust the same relative to each other.

7. A work holder for half bearing or like sections, comprising a block formed with a substantially semi-circular recess for receiving a bearing section, one face of said block being formed with recesses, inserts in said recesses adapted to engage the free longitudinal edges of the bearing section to adjust the same relative to each other, and means for adjusting said inserts and for securing the same in adjusted position.

8. A work holder for half bearing or like sections, comprising a block formed with a substantially semi-circular recess for receiving a bearing section, one face of said block being formed with recesses each having a longitudinally inclined wall, and wedge-shaped inserts in said recesses adapted to engage the free longitudinal edges of the bearing section to clamp the same and adjust the said edges relative to each other.

9. A work support for broaching machines having a broach reciprocable in an accurately predetermined path, comprising a work holder for receiving a bearing or like section to be broached, and means on said work holder for adjusting the parting edges of said bearing section relative to each other.

10. A work support for broaching machines including a reciprocable broach comprising a work-holder for receiving a bearing or like section to be broached, and inserts on said workholder engageable with the parting edges of the bearing section, said inserts being adjustable longitudinally of the parting edges to adjust the same relative to each other.

11. In a work holder for supporting bearing and like sections in a broaching machine or the like, a block formed with a suitably shaped recess to receive a bearing section, said block also being formed with recesses adjacent to the recess aforesaid, wedge shaped members positioned within said last mentioned recesses and means engageable with said wedge shaped members for positively feeding the same longitudinally of said recesses to adjust the parting edges of the said bearing section relative to each other.

12. A work holder for half bearings or like sections, including in combination a block formed with a recess for receiving a bearing section, and adjustable members carried by said block and engaging the parting edges of said bearing section for adjusting the parting edges of said bearing section relative to each other.

13. A work holder for half bearings or like sections, including in combination a block formed with a recess for receiving the bearing section, and means for adjusting the parting edges of said bearing section relative to the body of said bearing section, said means including members adjustably mounted in recesses formed in the wall of said first mentioned recess, said members being engageable with the free edges of the said bearing section.

In testimony whereof I affix my signature.
CHARLES W. EGGENWEILER.